United States Patent [19]
Sato et al.

[11] Patent Number: 5,663,625
[45] Date of Patent: Sep. 2, 1997

[54] SWITCH-TYPE RELUCTANCE MOTOR AND METHOD TO COMPENSATE FOR COUNTER ELECTROMOTIVE FORCE

[75] Inventors: Takashi Sato, Yamanashi; Kentaro Fujibayashi, Musashino, both of Japan

[73] Assignee: Fanuc Ltd., Minamitsuru-gun, Japan

[21] Appl. No.: 489,985

[22] Filed: Jun. 12, 1995

[30] Foreign Application Priority Data

Jun. 14, 1994 [JP] Japan .................................. 6-154315

[51] Int. Cl.⁶ .......................................... H02P 8/00
[52] U.S. Cl. .................................. 318/701; 318/685
[58] Field of Search ........................ 388/876, 928.1; 318/701, 254, 439

[56] References Cited

U.S. PATENT DOCUMENTS

| | | | |
|---|---|---|---|
| 4,350,940 | 9/1982 | Dupont | 318/603 |
| 4,549,122 | 10/1985 | Berkopec et al. | |
| 4,649,331 | 3/1987 | Jahns | 318/798 |
| 4,707,650 | 11/1987 | Base | 318/685 |
| 4,739,240 | 4/1988 | MacMinn et al. | 318/685 X |
| 4,868,479 | 9/1989 | Byong-Ho et al. | 318/721 |
| 5,012,171 | 4/1991 | Sember | 318/685 X |
| 5,451,846 | 9/1995 | Peterson et al. | 318/254 |
| 5,594,322 | 1/1997 | Rozman et al. | 318/254 X |

*Primary Examiner*—Brian Sircus
*Attorney, Agent, or Firm*—Staas & Halsey

[57] ABSTRACT

A switch-type reluctance motor and method to compensate for counter electromotive force. The switch-type reluctance motor includes an actual current detection unit to detect the actual current i of the motor or an electrical angle detection unit to detect the rotor electrical angle θ, a rotation rate detection unit to detect the rotor rotation rate and a counter electromotive force compensation unit to calculate a counter electromotive force compensation value based upon at least one of the actual current and the electrical angle, as well as the rotation rate. A voltage command is compensated with the calculated counter electromotive force compensation value Vc. Thus, counter electromotive force compensation corresponding to changes in the electrical angle θ and/or the current i is performed for the switch-type reluctance motor.

20 Claims, 8 Drawing Sheets

COUNTER ELECTROMOTIVE FORCE COMPENSATION VALUE TABLE
(WHERE THE SPEED AND THE ACTUAL CURRENT ARE VARIABLES)

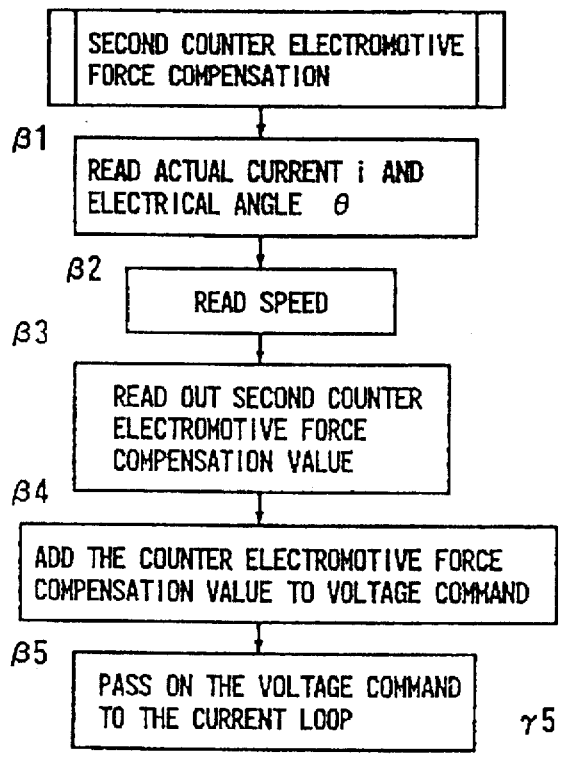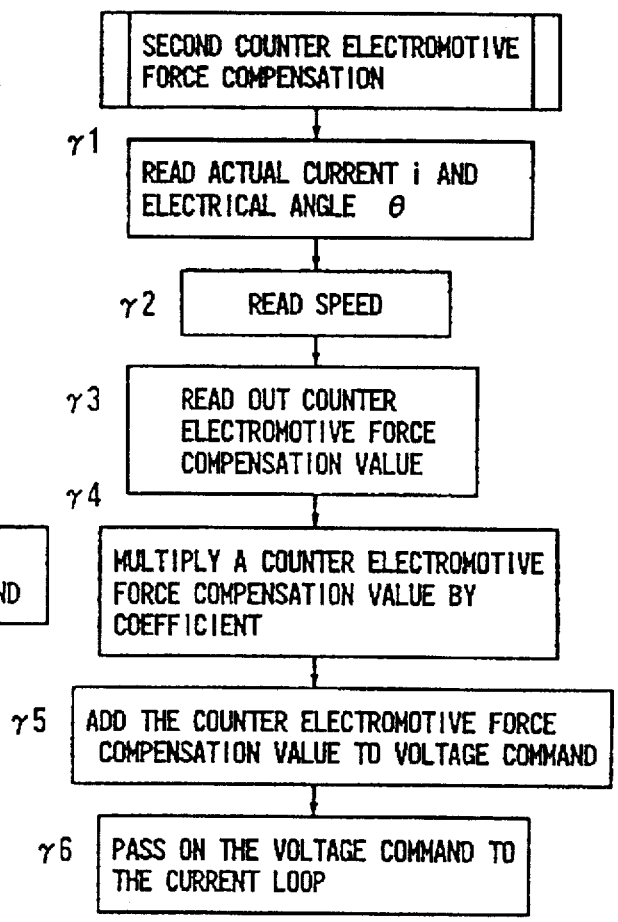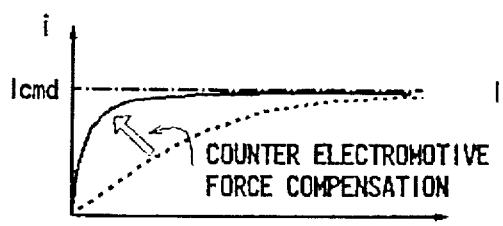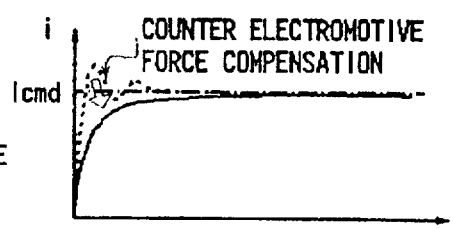

NO COUNTER ELECTROMOTIVE FORCE
COMPENSATION IS PERFORMED

COUNTER ELECTROMOTIVE FORCE
COMPENSATION IS PERFORMED

ACCELERATION / CONSTANT SPEED

DECELERATION

SWITCH-TYPE RELUCTANCE MOTOR AND METHOD TO COMPENSATE FOR COUNTER ELECTROMOTIVE FORCE

BACKGROUND OF THE INVENTION

1. Field of the Invention

The present invention relates to a method for controlling a switch-type reluctance motor and its apparatus and, in particular, relates to counter electromotive force compensation for a switch-type reluctance motor.

2. Description of the Related Art

The switch-type reluctance motor is designed to sequentially change by switching the coils to be excited when applied to the switch-type reluctance motor (e.g., a variable reluctance motor), which comprises a rotor and a stator respectively having salient poles and generates torque caused by magnetic attraction occurring in the salient poles when electric current is supplied to the coils wound round the salient poles of the stator.

FIGS. 10(a)–10(b) illustrate the method by which a reluctance motor is rotated. If the coil in phase A is excited when the rotor and the stator have the positional relationship shown in FIG. 10(a), the rotor starts to rotate in the counter-clockwise direction. If the coil in phase B is excited when the rotor and the stator have the positional relationship shown in FIG. 10(b), the rotor starts to rotate in the counter-clockwise direction. Likewise, if the coil in phase C is excited when the rotor and the stator have the positional relationship shown in FIG. 10(c), the rotor starts to rotate in the counter-clockwise direction.

In contrast, if the coil in phase B is excited in the state shown in FIG. 10(a), the coil in phase C in the state shown in FIG. 10(b) and the coil in phase A in the state shown in FIG. 10(c), the rotor starts to rotate in the clockwise direction.

Consequently, the phase of the coil, in which an electric current is to be applied, is determined based upon the position of the rotor, i.e., the electrical angle of the rotor, regardless of the direction of the electrical current to be supplied to the stator coil.

If an electric current is supplied to the coils between the position at which the stator salient poles and the rotor salient poles start to face each other and the position at which they completely face each other, a torque is generated in the direction of the rotation of the rotor.

FIGS. 11(a)–11(b) illustrate the torque in a reluctance motor. For instance, as shown in FIG. 11(a), if an electric current is supplied to the coil in phase A (the coil wound around the salient pole 20A) from the position at which the salient pole 20A in phase A of the stator 20 and the salient pole 21a, one of the salient poles of the rotor 21, start to face each other, the salient pole 20A in phase A of the stator 20 attracts the rotor salient pole 21a, to generate a torque that rotates the rotor 21 in the counter-clockwise direction as in FIG. 11(a). If the electric current is supplied in phase A until the rotor reaches the position at which the salient pole 20A in phase A of the stator 20 and the rotor salient pole 21a completely face each other, as shown in FIG. 11(b), a counter-clockwise torque is generated.

However, if the electric current is supplied in phase A until the rotor reaches a position beyond the position of the rotor 21 shown in FIG. 11(b) by rotating in the counter-clockwise direction, a clockwise torque is generated. That is, the torque is always generated in the direction in which magnetic resistance is reduced.

Now, the rotor position at which the stator salient pole 20A in phase A and one of the salient poles of the rotor 21 do not face each other at all, as shown in FIG. 11(a), is set as the electrical angle 0°, the rotor position at which the stator salient pole 20A and the rotor salient pole completely become opposite to each other, as shown in FIG. 11(b) as the electrical angle 180°, and the rotor position at which the stator salient pole 20A and the rotor salient pole do not face each other at all again, as the electrical angle 380°. With the electrical angles thus set, if an electric current is applied between the electrical angle 0° and the electrical angle 180°, a counter-clockwise torque is generated. If an electric current is applied between the electrical angle 180° and the electrical angle 360°, a clockwise torque is generated.

Development of torque depends upon the magnetic flux Φ generated between the stator and the rotor, and an electromotive force is generated in the motor due to a change in the flux with time. This electromotive force can be approximated with the following equation:

$$V = -d\Phi/dt = -(\partial\Phi/\partial i \times \partial i/\partial t + \partial\Phi/\partial\theta \times \partial\theta/\partial t) \tag{1}$$

Where i is the electric current, and θ the electrical angle.

In Eq. (1) above, the second term, $(-\partial\Phi/\partial\theta \times \partial\theta/\partial t)$ represents the counter electromotive force. During low speed rotation (when $\partial\theta/\partial y$ is small), since the effect of the term of this counter electromotive force term is small, compensation through PI control or PID control of the current suffices. However, during high speed rotation (when $\partial\theta/\partial t$ is large), the voltage due to the term of this counter electromotive force becomes large. Because of this, the voltage which is actually applied to a coil changes greatly in correspondence to the speed, and sufficient compensation cannot be performed through current PI control or PID control.

To deal with this, in a conventional switch-type reluctance motor, $(\partial\Phi/\partial\theta)$, the second term, is set as a constant value, and, by adding a command value which is in proportion to the speed, voltage drops and voltage increases due to the counter electromotive force are compensated, so that the effect of the counter electromotive force is compensated.

FIG. 12 is a block diagram illustrating counter electromotive force compensation in a switch-type reluctance motor in the prior art. The speed of the motor 5 can be obtained as a feedback speed via a rotary encoder 6 and a speed detector term 7. The value obtained by subtracting the aforementioned feedback speed from the speed command v cmd is input to a block 1 for PI compensation. The block 1 for PI compensation outputs an electric current command i cmd. The electric current that is fed back from a PWM amplifier 4 via a block 8 for current detection is subtracted from the electric current command i cmd. This difference is input to a block 2 for excitation phase switching via a block 11 for phase advance compensation.

A block 20 for counter electromotive force compensation outputs a counter electromotive force compensation value which corresponds to the speed output from the block 7 for speed detection. The counter electromotive force compensation value is added to the voltage command from a block 3 for current loop gain, and the sum is inputted to the PWM amplifier 4 to send a command to the motor 5.

The counter electromotive force compensation is performed in such a manner that, as shown in FIG. 13(a)–13(b) instance, the current value ifb, which is reduced due to the counter electromotive force, is corrected towards the value of the current command I cmd.

In a switch-type reluctance motor in the prior art, counter electromotive force compensation is performed in the following manner: $\partial\Phi/\partial\theta$, which is the change in the magnetic flux $\Phi$ relative to the change in the electrical angle $\theta$ in the counter electromotive force term, is set as a constant value K. With the counter electromotive force Vr expressed as Vr=K×$\partial\Phi/\partial\theta$, a command value which is in proportion to the speed $\partial\Phi/\partial\theta$ is added to. In this manner, drops and rises of voltage due to the counter electromotive force are compensated.

However, in a reluctance motor, $\partial\Phi/\partial\theta$ is not a constant value, but is a value dependent on the electrical angle $\theta$ and the current i. Because of this, when $\partial\Phi/\partial\theta$ is set as a constant value, as it is in counter electromotive force compensation in the prior art, there is a problem such that compensation is either excessive or inadequate depending upon the conditions.

FIGS. 14(a)–14(b) illustrate the state of the counter electromotive force Vr when $\partial\Phi/\partial\theta$ depends Upon the electrical angle $\theta$. FIG. 14(a) illustrates the case where the excitation is for acceleration, constant speed and deceleration, while FIG. 14(b) shows the magnetic flux $\Phi$, and FIG. 14(c) $\partial\Phi/\partial\theta$ and FIG. 14(d) show the counter electromotive force Vr. Note that FIG. 14 shows a case where the electric current i is constant. As shown in FIG. 14(d), the counter electromotive force Vr changes in correspondence to the electrical angle $\theta$. When the speed is increasing, as well as when the speed is constant, a negative counter electromotive force Vr is generated, while, a positive counter electromotive force Vr is generated when the speed is decreasing.

FIGS. 15(a)–15(b) illustrate the change in the current value caused by the counter electromotive force during excitation for acceleration, constant speed and deceleration. As shown in FIG. 15, in each acceleration state, the current value changes due to a counter electromotive force in the direction indicated with the arrow to generate the current curve indicated with the dotted line. As shown in FIG. 15(a), during acceleration operation and constant speed operation, the current value is reduced, since the counter electromotive force Vr is a negative value, as can be seen in FIG. 14(d). Also, as shown in FIG. 15(b), during deceleration operation, the current value increases as shown in FIG. 14(d), since the counter electromotive force is a positive value.

Likewise, even when $\partial\Phi/\partial\theta$ is dependent on the electric current value i, the change in the counter electromotive force Vr causes the current value to change. Thus, like the case of conventional compensation against counter electromotive force, if the compensation against the counter electromotive force is applied uniformly without varying the compensation depending on electric angle $\theta$ and electric current i, it is not possible for the electric current to be compensated corresponding to the variation of the current as is shown in FIGS. 15(a)–15(b), thereby causing the compensation to be either excessive or insufficient.

OBJECT AND SUMMARY OF THE INVENTION

The object of the present invention is to provide a switch-type reluctance motor with which counter electromotive force compensation which corresponds to changes in the electrical angle and the current i can be performed by solving the problems of the prior art as are described earlier.

The outline of the present invention is as follows.

In a switch-type reluctance motor according to the present invention, the object of the invention is achieved by determining a counter electromotive force compensation value based upon the actual current value of the motor or the electrical angle and the motor rotation rate, performing compensation for the voltage command using the determined counter electromotive force compensation value and driving the reluctance motor with the voltage command for which counter electromotive force compensation has been performed.

Also, in a switch-type reluctance motor according to the present invention, the object of the invention is achieved by determining a counter electromotive force compensation value based on the motor rotation rate, the actual current value in the motor and the electrical angle, performing compensation for the voltage command using the determined counter electromotive force compensation value and driving the reluctance motor with the voltage command for which the counter electromotive force compensation has been performed.

The compensation value against the counter electromotive force applied in the compensation against the counter electromotive force according to the present invention can be obtained in the form of a table or relational expression with variables being the motor rotation rate and actual current value in the motor, or motor rotation rate and electric angle, or motor rotation rate, actual current value in the motor and electric angle, whereby the value for compensation can be obtained either by reading the table or by making a calculation using the relational expression depending on such variables. Also, in a switch-type reluctance motor according to the present invention, the object of the invention is achieved by providing an actual current detection means for detecting the actual current of the motor or electrical angle detection means for detecting the rotor electrical angle, rotation rate detection means for detecting the rotor rotation rate, and counter electromotive force compensation means for calculating a counter electromotive force compensation value based upon the actual current or the electrical angle and the rotation rate detected by those detection means and by performing compensation for the voltage command with the calculated counter electromotive force compensation value.

Furthermore, in a switch-type reluctance motor according to the present invention, the object of the invention is achieved by providing rotation rate detection means for detecting the rotor rotation rate, actual current detection means for detecting the actual current of the motor, electrical angle detection means for detecting the rotor electrical angle and counter electromotive force compensation means for calculating a counter electromotive force compensation value based upon the rotation rate, the actual current and the electrical angle detected by these detection means and by performing compensation for the voltage command with the calculated counter electromotive force compensation value.

In the switch-type reluctance motor according to the present invention, the actual current value of the motor or the electrical angle is determined and the motor rotation rate is also determined. By using the obtained rotation rate and either the actual current value of the motor or the electrical angle, or the rotation rate of the motor and both the actual current value and the electrical angle as variables in a data table or in a relational expression, a counter electromotive force compensation value determined in advance is either read out or calculated. Then, with this obtained counter electromotive force compensation value, the voltage command is compensated, and using this compensated voltage command, the reluctance motor is driven.

FIG. 1 is a block diagram illustrating counter electromotive force compensation in the switch-type reluctance motor according to the present invention. This block diagram shows a part of the speed loop in a servo system. In FIG. 1, reference number 2 indicates an excitation phase switching block which sets the phase to which an exciting current is supplied, reference number 3 indicates a current loop gain block, reference number 4 indicates a PWM amplifier, and reference number 10 indicates a counter electromotive force compensation block.

The counter electromotive force compensation block 10 inputs the rotation rate, either the actual current i or the electrical angle θ, or both the actual current i and the electrical angle θ, and outputs the counter electromotive force compensation value which corresponds to those input values. Then, this counter electromotive force compensation value is added to the voltage command, which is a value output from the current loop gain block 3, to calculate the voltage command for which counter electromotive force compensation has been performed. This voltage command is then input to the PWM amplifier 4.

With this, the counter electromotive force compensation can be made corresponding to changes in the actual current i and the electrical angle θ, instead of corresponding only to the rotation rate.

BRIEF DESCRIPTION OF THE DRAWINGS

FIGS. 7(a)–(c) are flow charts illustrating the effects of an embodiment of the present invention;

FIGS. 8(a)–8(b) illustrate counter electromotive force compensation;

DETAILED DESCRIPTION OF THE PREFERRED EMBODIMENT

The following is a detailed explanation of embodiments of the present invention with reference to the drawings.

(Servo motor control system for an embodiment of the present invention)

Figure 1:
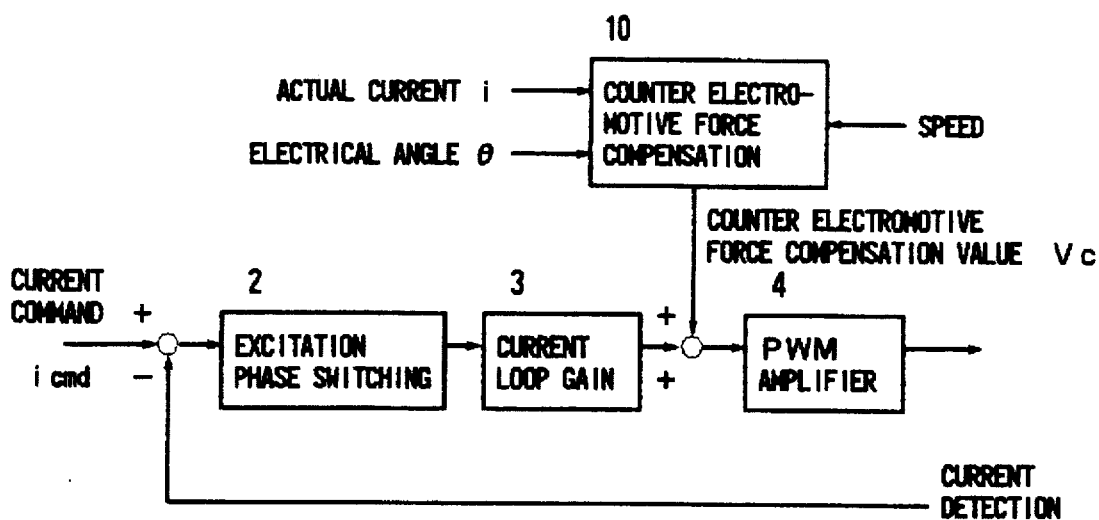
FIG. 1 is a block diagram illustrating the method of counter electromotive force compensation in a switch-type reluctance motor according to the present invention.
Figure 2:
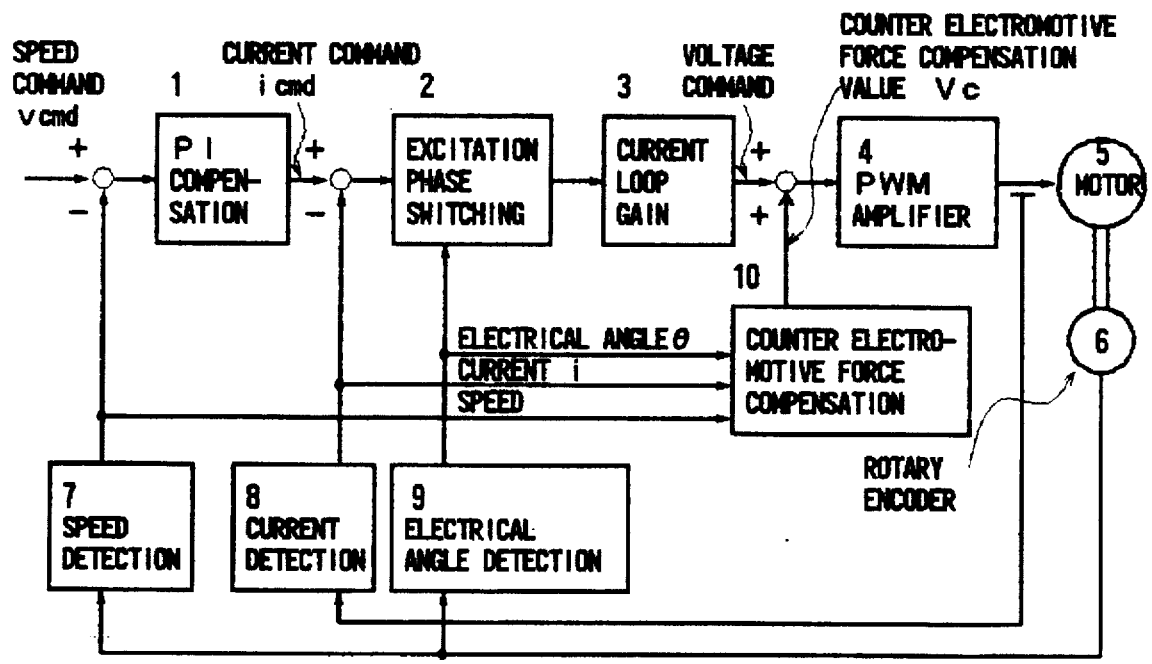
FIG. 2 is a block diagram of the essential part of the servo motor control for a machine that is an embodiment which implements the method of servo motor control according to the present invention.

First, the servo motor control system for implementing the method of counter electromotive force compensation according to the present invention is explained. FIG. 2 is a block diagram of an essential part of the servo motor control for a machine that is an embodiment of the method of servo motor control according to the present invention.

In FIG. 2, the speed of the motor 5 can be obtained as a feedback speed via a rotary encoder 6 and a speed detector 7. The value obtained by subtracting the aforementioned feedback speed from the speed command v cmd is input to block 1 for PI compensation. The block 1 for PI compensation outputs an electric current command i cmd. The electric current that is fed back from a PWM amplifier via block 8 for current detection is subtracted from the electric current command i cmd and this difference is input to block 2 for excitation phase switching for phase advance compensation.

The block 2 for excitation phase switching switches the excitation phases to which the electric current command, which is the difference between the aforementioned electric current command i cmd and the feedback current, is supplied, and also supplies an exciting current to the stator during the excitation. This switching of excitation phases in the block 2 for excitation phase switching is implemented by first inputting the electrical angle which is obtained via the rotary encoder 8 and block 9 for electrical angle detection and comparing this electrical angle with the excitation phase switching angle, whereby the passage of the rotor through the excitation phase switching angle is detected. The excitation phase is switched when the electrical angle has passed a set specific excitation phase switching angle.

In addition, the block 2 for excitation phase switching inputs the electrical angle, which is obtained via the rotary encoder 8 and the block 9 for electrical angle detection, and compares this electrical angle with the excitation start angle and the excitation end angle, when supplying the exciting current in the excitation block 2, whereby it is detected that the rotor has passed the excitation start angle and the excitation end angle in the excitation block. Then, excitation of the stator starts when the electrical angle reaches the excitation start angle and the excitation of the stator ends when the electrical angle reaches the excitation end angle.

The electric current command from the block 2 for excitation phase switching becomes a voltage command after going through a block 3 for current loop gain and is then sent to the motor 5 via the PWM amplifier 4.

In the structure according to the present invention, the voltage command for which counter electromotive force compensation has been performed is determined by adding a counter electromotive force compensation value to the voltage command output from the block 3 for current loop gain, and the PWM amplifier 4 is driven with this voltage command.

The rotor rotation rate from block 7 for speed detection is input to block 10 for counter electromotive force compensation, and the actual current i of the motor from block 8 for current detection and the rotor electrical angle θ from block 9 for electrical angle detection are also input to the same block. The present invention may be constituted by inputting at least the actual current i or the electrical angle θ, or by inputting both the actual current i and the electrical angle θ. When only the actual current i is input, the block 10 for counter electromotive force compensation outputs a counter electromotive force compensation value Vc with the actual current i and the rotor rotation rate used as variables.

If, on the other hand, only the electrical angle θ is input, a counter electromotive force compensation value Vc is output with the electrical angle θ and the rotor rotation rate used as variables. In addition, if only the electrical angle θ is input, a counter electromotive force compensation value Vc may be output with the actual current i, the electrical angle θ and the rotor rotation rate used as variables.

The block 10 for counter electromotive force compensation may be constituted, for instance, by storing in memory such as a ROM, a table containing the rotation rate and the actual current, the rotation rate and the electrical angle, or the rotation rate, the actual current and the electrical angle, as variables, and the counter electromotive force compensation value Vc as a data value. The block 10 may also be constituted by storing in memory such as a ROM, a relational expression representing the relationship between the rotation rate and the actual current, or the relationship between the rotation rate and the electrical angle, or the relationship among the rotation rate, the actual current and the electrical angle, and by substituting in the relational expression that is read out the rotation rate and the actual current, the rotation rate and the electrical angle, or the rotation rate, the actual current and the electrical angle used as variables to determine a counter electromotive force compensation value Vc.

(Effects of the embodiment of the present invention)

Next, the effects of the embodiment of the present invention are explained. In the block 10 for counter electromotive force compensation, the relationship of the counter electromotive force compensation value Vc with the rotation rate and the actual current i when the electrical angle θ is fixed is illustrated in the relational diagram shown in FIG. 3, for instance. Also, the relationship of the counter electromotive force compensation value Vc with the rotation rate and the electrical angle θ when actual current i is fixed is illustrated in the relational diagram shown in FIG. 4, for instance. In the relational diagram in FIG. 3, the actual current i is plotted on the x axis, the rotation rate v on the y axis, and the counter electromotive force compensation value Vc on the z axis, while in the relational diagram in FIG. 4, the electrical angle θ is plotted on the x axis, the rotation rate v on the y axis, and the counter electromotive force compensation value Vc on the z axis.

Figure 3:
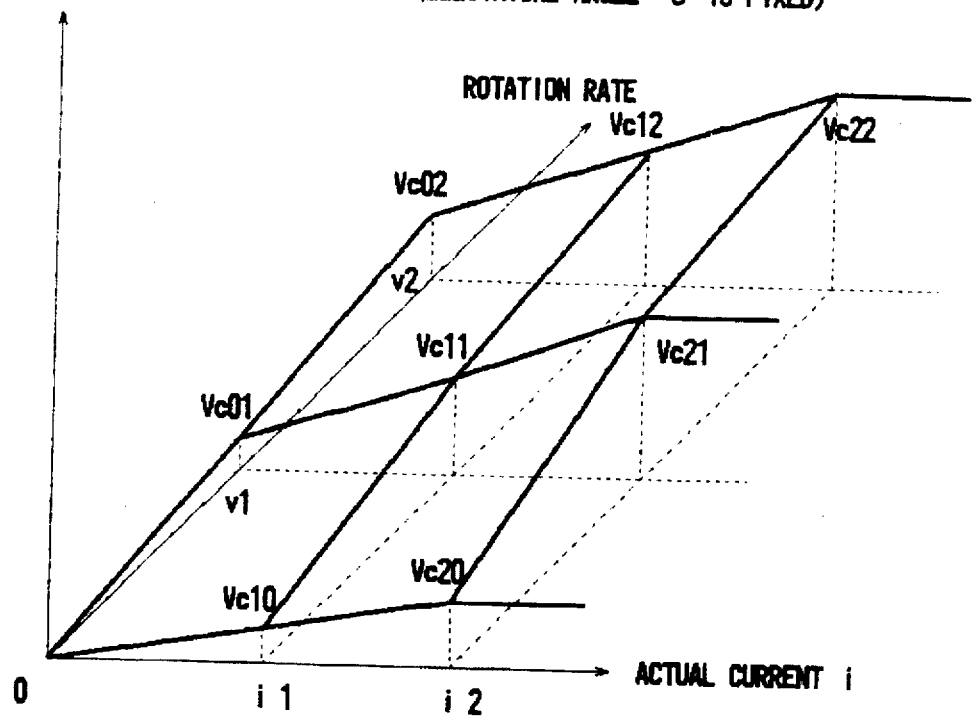
FIG. 3 is a diagram showing the relationship of the counter electromotive force compensation value with the rotation rate and the actual current where the electrical angle is fixed.
Figure 4:
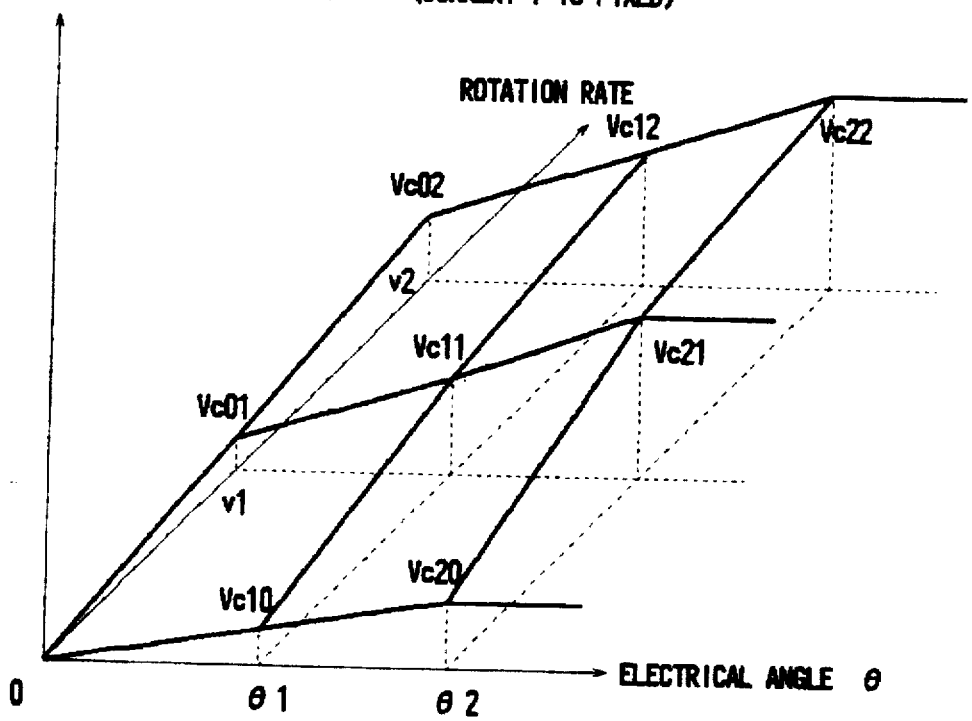
FIG. 4 is a diagram showing the relationship of the counter electromotive force compensation value with the rotation rate and the electrical angle where the actual current is fixed.

For instance, as shown in FIG. 3, with the rotation rate at v1, the counter electromotive force compensation value Vc becomes Vc01 when the actual current is at 0; the counter electromotive force compensation value Vc becomes Vc11 when the actual current is at i1; and the counter electromotive force compensation value Vc becomes Vc21 When the actual current is at i2.

The block 10 for counter electromotive force compensation inputs the values of the rotation rate v and the actual current i, or the values of the rotation rate and the electrical angle θ, or the values of the rotation rate v, the actual current i and the electrical angle θ, determines the counter electromotive force compensation value Vc which corresponds to each of those values, and then adds that value to the voltage command to perform counter electromotive force compensation.

Note that no diagram is shown illustrating the counter electromotive force compensation value Vc when the values of the rotation rate v, the actual current i and the electrical angle θ are used as variables.

Figure 5:
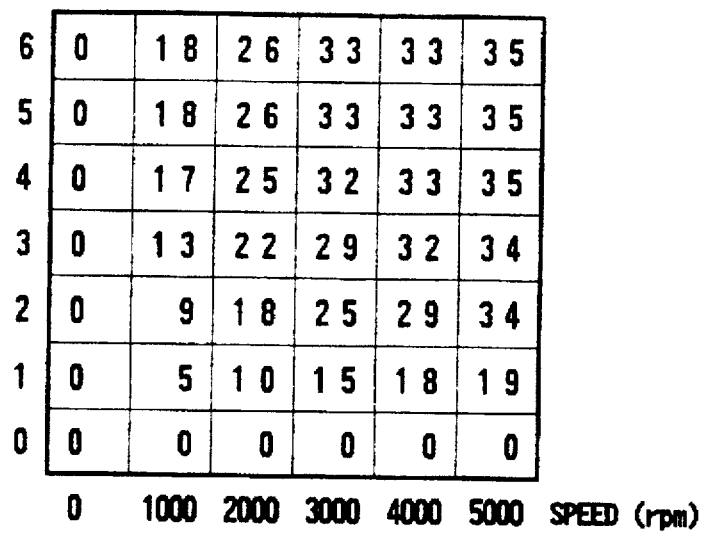
FIG. 5 is a data table of the counter electromotive force compensation value Vc.
Figure 6:
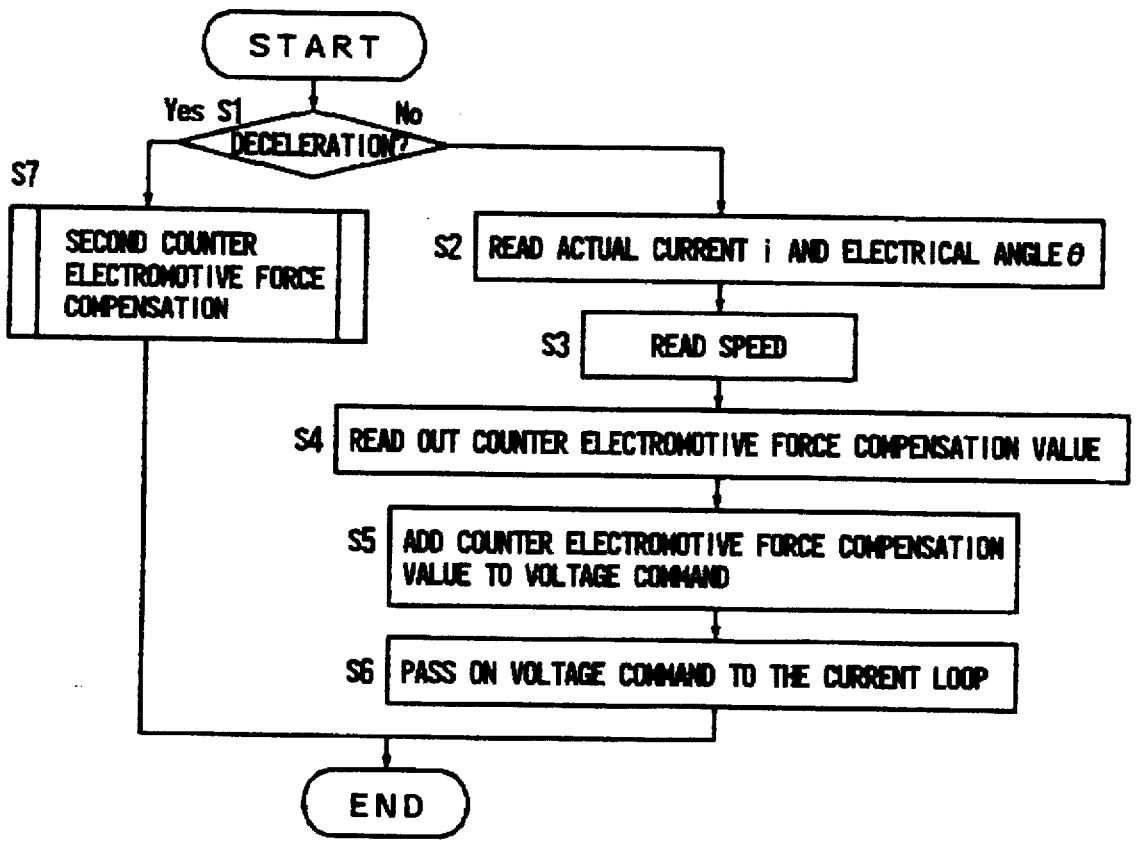
FIG. 6 is a flow chart illustrating the effects of the embodiment of the present invention.

The relationships shown in FIG. 3 are expressed in a table format in FIG. 5, which shows a table of the counter electromotive force compensation values Vc. In block for counter electromotive force compensation, this table is stored in the memory, and the counter electromotive force compensation value Vc can be obtained by reading the contents of the table by the addresses corresponding to the rotation rate and actual current i.

The following is an explanation of the effects of the embodiment of the present invention in reference to the flow charts in FIGS. 6 and 7(a)–7(c). Note that a step code S is used in the flow chart in FIG. 6 and the step codes α, β and γ are used in FIGS. 7(a)–7(c) for explanation.

Figure 14A:
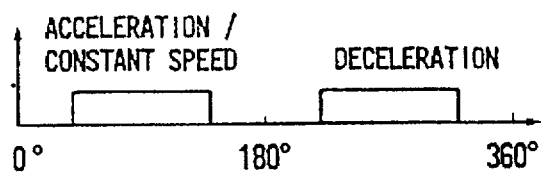
FIGS. 14(a)–14(d) illustrates changes in the state of the counter electromotive force Vr depending upon the electrical angle.
Figure 14B:
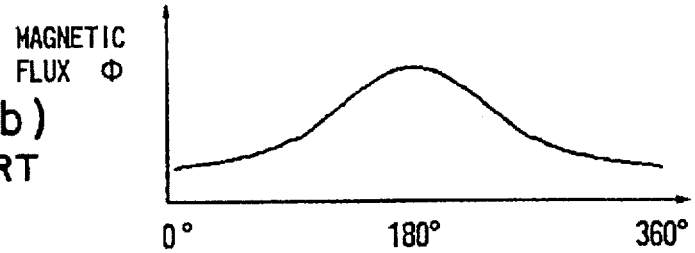
Figure 14C:
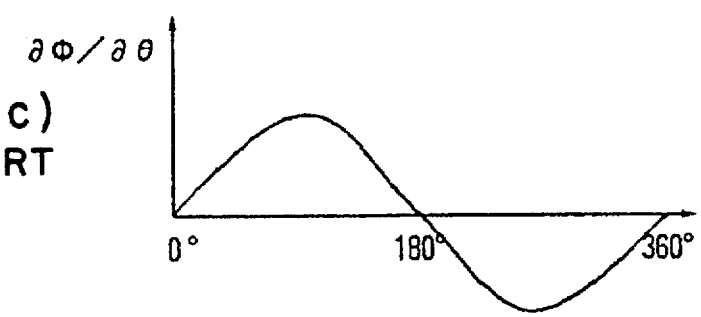
Figure 14D:
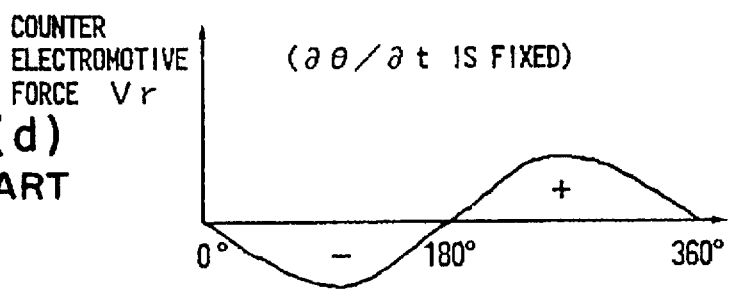
Figure 15A:
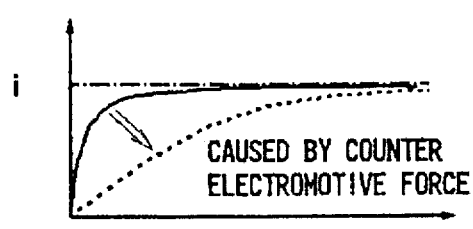
FIGS. 15(a)–15(b) illustrate changes in the current value caused by the counter electromotive force.
Figure 15B:
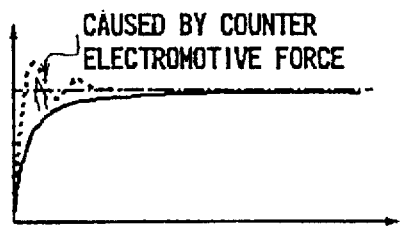

Step S1: First, a judgment is made as to the whether the excitation of the stator is for deceleration or acceleration or constant speed. This judgment can be made by, for instance, comparing the speed command v cmd with the speed output from the block for speed detection 7. If the detected speed is higher than the speed command v cmd, the brake will be applied to reduce the speed. On the other hand, if the speed command v cmd is equal to or greater than the detected speed, the speed is increased. In this stage, whether the excitation is for deceleration or acceleration or constant speed is judged, since the effect of the counter electromotive force varies depending on the result of excitation as shown in FIGS. 14(a) and 15(b). When the speed is increasing or is constant, the processings in steps S2–S8 are performed, and if the speed is decreasing, the processing for second counter electromotive force compensation in step S7 is performed. The processing for the second counter electromotive force compensation in step S7 will be explained in reference to the flow charts in FIG. 7(a)–7(c).

Step S2: When the speed is being accelerated or is constant, either the actual current i or the electrical angle θ is read, or both the actual current i and the electrical angle θ are read. Reading of the actual current i is performed by inputting the current value output from the current detection block 8 to the block 10 for counter electromotive force compensation. Reading of the electrical angle θ is performed by inputting the electrical angle output from the block 9 for electrical angle detection to the block 10 for counter electromotive force compensation.

When determining a counter electromotive force compensation value Vc with both the actual current i and the electrical angle θ as variables, both the actual electric current i and the electrical angle θ are input to the block 10 for counter electromotive force compensation.

Step S3: Next, the rotation rate is read. Reading of the rotation rate is performed by inputting the rotation rate output from the block for speed detection 7 to the block 10 for counter electromotive force compensation.

Step S4: Now the counter electromotive force compensation value Vc is read out based upon the rotation rate, the actual current i and the electrical angle θ which were read during preceding steps S2 and S3. This read out of the counter electromotive force compensation value Vc may be performed by reading out the values that are the contents at the addresses of the rotation rate and the actual current i from the data table stored in memory when using a data table. If a relational expression is to be used, the readout is performed by reading out the relational expression stored in memory that expresses the relationship between the rotation rate and the actual current, the relationship between the rotation rate and the electrical angle, or the relationships among the rotation rate, the actual current and the electrical angle, and by substituting the values of the rotation rate and the actual current, the rotation rate and the electrical angle, or the rotation rate, the actual current and the electrical angle in the relational expression thus read out.

Steps S5, S6: A compensated voltage command is determined by adding the counter electromotive force compensation value Vc, which was determined in the preceding step S4, to the voltage command, and this new voltage command is passed on to the current loop to perform motor control.

For acceleration of the speed or constant speed operation, as in this case, the current value decreased due to the counter electromotive force, indicated with the dotted line in FIG. 8(a), is increased in the direction of the arrow to obtain the current value indicated with the solid line.

Next, the operation for deceleration is explained in reference to the three flow charts shown in FIGS. 7(a)–(c).

As explained earlier with reference to FIGS. 14(a)–15(b), since a counter electromotive force Vr acts in the direction in which the current increases during speed reduction, a reverse effect is created, which results in a lengthening of the time required for the speed to decrease when counter electromotive force compensation is performed in such a case. Therefore, where it is known that the current will not overshoot largely, it is more advantageous for the control of the motor not to compensate against the counter electromotive force, in that the speed can be reduced in a shorter period of time. Thus, it is possible for us to consider the control motor by not compensating against the counter electromotive force at the time of speed reduction and the control of the motor by compensating against the counter electromotive force at the time of speed reduction with a small counter electromotive force compensation value. The flow chart in FIG. 7(a) represents a case in which counter electromotive force compensation is not performed during speed reduction and the flow charts in FIG. 7(b) and (c) represent cases in which counter electromotive force compensation is performed with a small counter electromotive force compensation value during speed reduction.

In FIG. 7(a):

Step α1: Nothing is performed for second counter electromotive force compensation, and the voltage command is passed on intact to the current loop, to drive the motor. By doing so, the motor current is increased due to the counter electromotive force Vr, thereby reducing the time required for decreasing the speed.

The flow chart in FIG. 7(b) represents a case in which counter electromotive force compensation is performed with a small counter electromotive force compensation value. This operation can be performed through processing that is virtually identical to that performed in steps S2–S6 in the flow chart of FIG. 6. The process differs from the processes in steps S2–S8 at step β3 which corresponds to step S4. Therefore, we will explain only the process in step βS here, and a explanation of steps β1, β2, β4 and β5 will be omitted.

Step βS: In the same manner as that used in step S2, a counter electromotive force compensation value Vc is read out based upon the rotation rate, the actual current i and the electrical angle α which have been read in. When reading out this counter electromotive force compensation value Vc, the values corresponding to the time of acceleration and the time of operation at constant speed in the data table to be stored in the memory can be altered to smaller values, or the degree of inclination of the relational expression can be reduced.

By doing so, the counter electromotive force compensation value Vc for counter electromotive force compensation can be reduced.

The flow chart in FIG. 7(c) represents another case in which counter electromotive force compensation is performed with a small counter electromotive force compensation value. This operation can be performed through processing that is virtually identical to that performed in steps S2–S6 in the flow chart of FIG. 6. The process differs from that performed in steps S2–S6 in that the process of step γ is added between steps γ3 and γ5 which correspond to steps S4 and S5, respectively. Therefore, we will explain only the process in step γ4 here, and explanation of steps γ1, γ2, γ3, γ5 and γ6 will be omitted.

Step γ4: In this step, in the same manner as in step S4, after reading a counter electromotive force compensation value Vc, the counter electromotive force compensation value Vc is multiplied with a coefficient in order to be reduced.

By doing so, the counter electromotive force compensation value Vc for counter electromotive force compensation can be reduced.

(Case example)

Figure 9A:
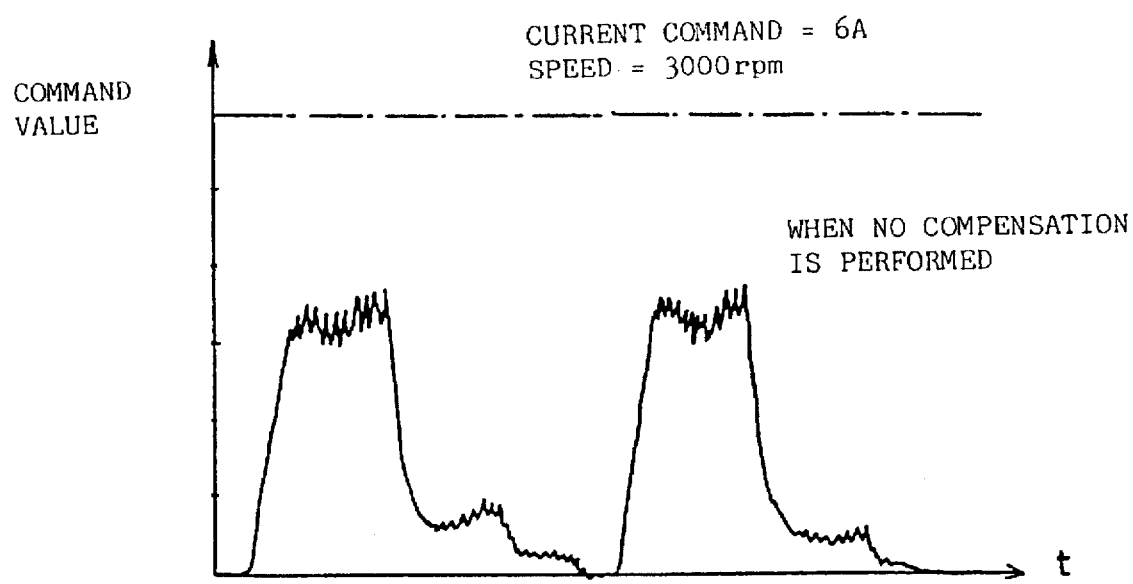
FIGS. 9(a)–9(b) show an actual example of counter electromotive force compensation.
Figure 9B:
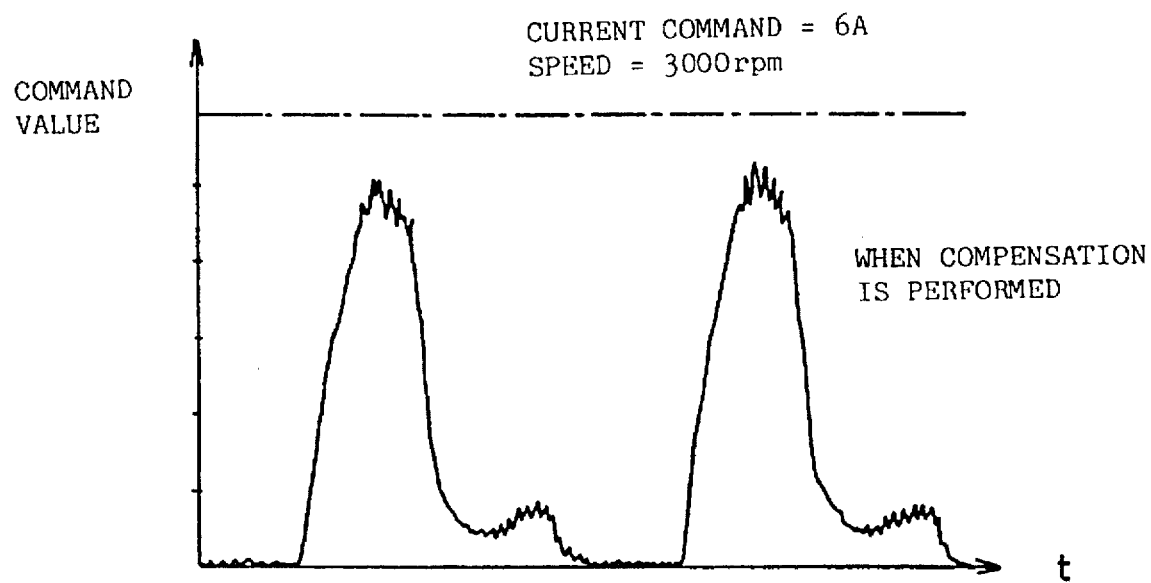
Figure 10A:
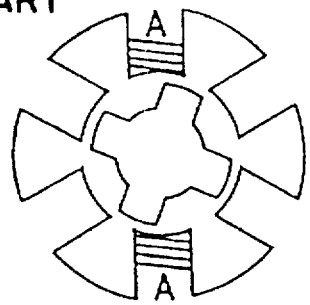
FIGS. 10(a)–10(c) illustrate the method with which a conventional reluctance motor is rotated.
Figure 10B:
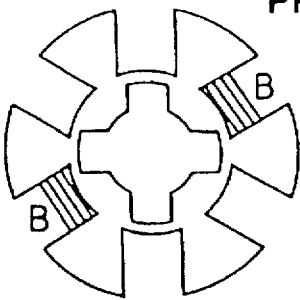
Figure 10C:
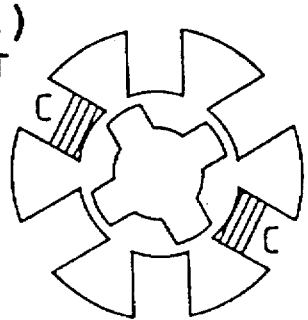
Figure 11A:
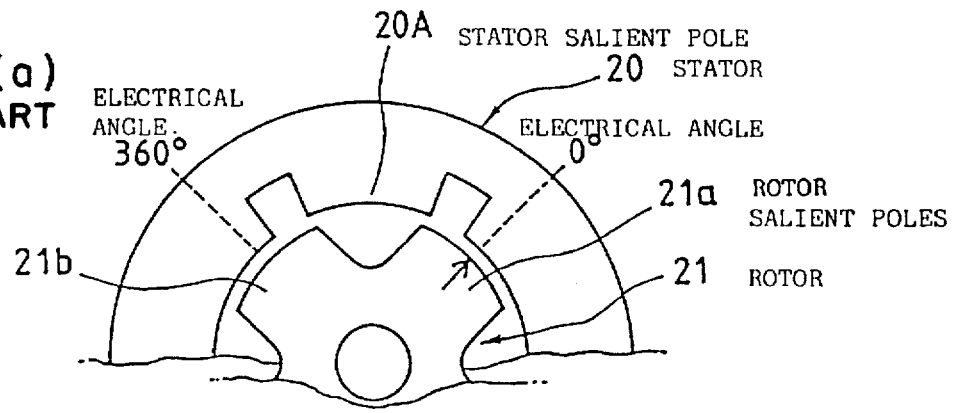
FIGS. 11(a)–11(b) illustrate the torque in the conventional reluctance motor of FIGS. 10(a)–10(c)
Figure 11B:
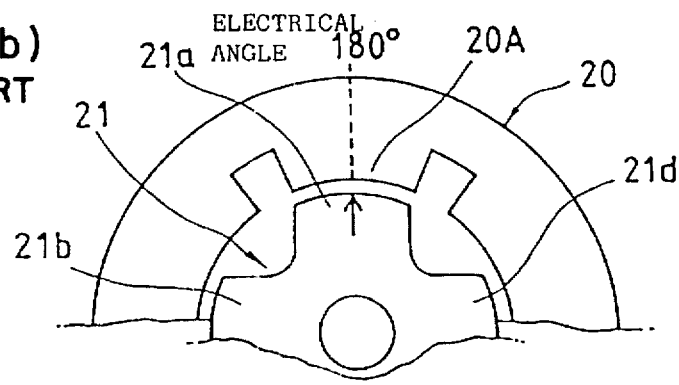
Figure 12:
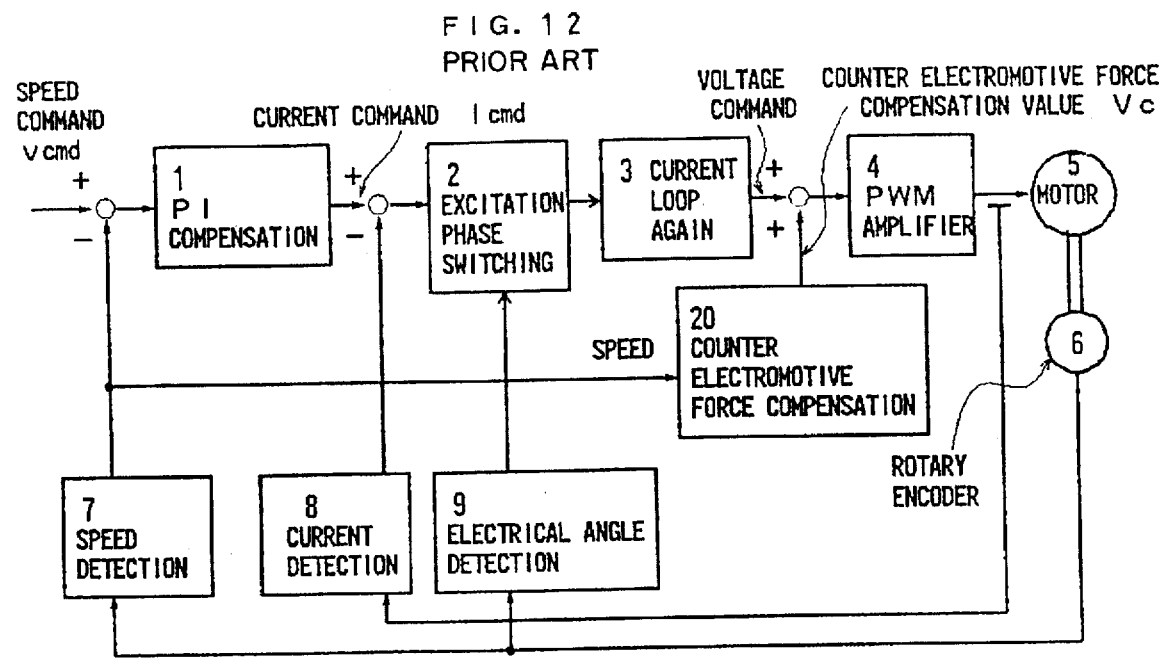
FIG. 12 is a block diagram illustrating a conventional method of counter electromotive force compensation is a switch-type reluctance motor.
Figure 13A:
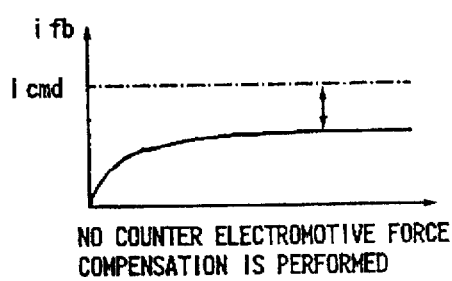
FIGS. 13(a)–13(b) illustrate conventional counter electromotive force compensation.
Figure 13B:
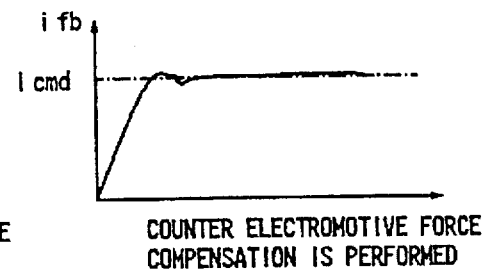

FIGS. 9(a) and 9(b) show the states of currents where counter electromotive force compensation is not performed (FIG. 9(a)) and where counter electromotive force compensation is performed (FIG. 9(b)) with the electric current command for 6A and at speed of 3000 rpm. These diagrams indicate that by performing counter electromotive force compensation, the current value can be made approximate to the commanded value.

As has been explained by now, the present invention provides a method for performing counter electromotive force compensation for a switch-type reluctance motor in which counter electromotive force compensation can be performed corresponding to changes in the electrical angle θ and the current i.

What is claimed is:

1. A method of compensating for counter electromotive force for a switch-type reluctance motor to be driven based upon a voltage command, said method comprising the steps of:

determining a rotation rate of the motor and at least one of an actual current value and an electrical angle;

determining a counter electromotive force compensation value based upon the rotation rate and at least one of the actual current value and the electrical angle; and adding the counter electromotive force compensation value to the voltage command to generate a new voltage command to drive the motor, thereby compensating for the counter electromotive force.

2. A method of counter electromotive force compensation for a switch-type reluctance motor according to claim 1, wherein said step of determining a counter electromotive force compensation value comprises the steps of:

prestoring a plurality of counter electromotive force compensation values in a table based upon rotation rates and the at least one of actual current values and electrical angles as variables; and reading out the counter electromotive force compensation value from the plurality of counter electromotive forces prestored in the table based upon the determined rotation rate and at least one of the actual current value and the electrical angle.

3. A method of counter electromotive force compensation for a switch-type reluctance motor according to claim 1, wherein said step of determining a counter electromotive force compensation value comprises the steps of:

preestablishing a relational expression for counter electromotive force compensation values using rotation rates and at least one of actual current values and electrical angles of the motor as variables; and determining the counter electromotive force compensation value using the preestablished relational expression, the determined rotation rate and the at least one of the actual current value and the electrical value.

4. A method of counter electromotive force compensation for a switch-type reluctance motor as claimed in claim 1, wherein said step of determining a counter electromotive force value comprises the steps of:

prestoring a plurality of counter electromotive force compensation values in a table based upon rotation rates and the at least one of actual current values and electrical angles as variables;

determining whether an excitation of a stator of the motor is for deceleration by comparing a speed command with the rotation rate; and reading out the counter electromotive force compensation value from the plurality of counter electromotive force compensation values prestored in the table based upon the determined rotation rate and at least one of the actual current value and the electrical angle, if the excitation is for acceleration or constant speed.

5. A method of counter electromotive force compensation for a switch-type reluctance motor as claimed in claim 1, wherein said step of determining a counter electromotive force value comprises the steps of:

prestoring a plurality of counter electromotive force compensation values in a table based upon rotation rates and the at least one of actual current values and electrical angles as variables;

determining whether an excitation of a stator of the motor is for deceleration by comparing a speed command with the rotation rate;

reading out the counter electromotive force compensation value from the plurality of counter electromotive force compensation values prestored in the table based upon the determined rotation rate and at least one of the actual current value and the electrical angle and altering the counter electromotive force compensation value to a smaller value, if the excitation is for deceleration; and reading out the counter electromotive force compensation value from the plurality of counter electromotive force compensation values prestored in the table based upon the determined rotation rate and at least one of the actual current value and the electrical angle, if the excitation is for acceleration or constant speed.

6. A method of counter electromotive force compensation for a switch-type reluctance motor as claimed in claim 1, wherein said step of determining a counter electromotive force value comprises the steps of:

preestablishing a relational expression for counter electromotive force compensation values using rotation rates and at least one of actual current values and electrical angles of the motor as variables;

determining whether an excitation of a stator of the motor is for deceleration by comparing a speed command with the rotation rate; and determining the counter electromotive force compensation value using the preestablished relational expression, the determined rotation rate and the at least one of the actual current value, and the electrical value, if the excitation is for acceleration or constant speed.

7. A method of counter electromotive force compensation for a switch-type reluctance motor as claimed in claim 1, wherein said step of determining a counter electromotive force value comprises the steps of:

preestablishing a relational expression for counter electromotive force compensation values using rotation rates and at least one of actual current values and electrical angles of the motor as variables;

determining whether an excitation of a stator of the motor is for deceleration by comparing a speed command with the rotation rate;

determining the counter electromotive force compensation value using the preestablished relational expression, the determined rotation rate and the at least one of the actual current value and the electrical value and adjusting the counter electromotive force compensation value by multiplying the same by a coefficient, if the excitation if the excitation is for deceleration; and determining the counter electromotive force compensation value using the preestablished relational expression, the determined rotation rate and the at least one of the actual current value and the electrical value, if the excitation is for acceleration or constant speed.

8. A method of counter electromotive force compensation for a switch-type reluctance motor to be driven based upon a voltage command, said method comprising the steps of:

determining a rotation rate of the motor, an actual current value, and an electrical angle;

determining a counter electromotive force compensation value based upon the motor rotation rate, the actual current value, and the electrical angle; and adding the counter electromotive force compensation value to the voltage command to generate a new voltage command to drive the motor, thereby compensating for the counter electromotive force.

9. A method of counter electromotive force compensation for a switch-type reluctance motor according to claim 8, wherein said step of determining a counter electromotive force compensation value comprises the steps of:

prestoring a plurality of counter electromotive force compensation values in a table based upon rotation rates, actual current values, and electrical angles as variables; and reading out the counter electromotive force compensation value from the plurality of counter electromotive force compensation values prestored in the table based upon the determined rotation rate, the actual current value, and the electrical angle.

10. A method of counter electromotive force compensation for a switch-type reluctance motor according to claim 8, wherein said step of determining a counter electromotive force compensation value comprises the steps of:

preestablishing a relational expression for counter electromotive force compensation values using rotation rates, actual current values, and electrical angles of the motor as variables; and determining the counter electromotive force compensation value using the preestablished relational expression, the determined rotation rate, the actual current value, and the electrical value.

11. A method of counter electromotive force compensation for a switch-type reluctance motor as claimed in claim 8, wherein said step of determining a counter electromotive force value comprises the steps of:

prestoring a plurality of counter electromotive force compensation values in a table based upon rotation rates, actual current values, and electrical angles as variables;

determining whether an excitation of a stator of the motor is for deceleration by comparing a speed command with the rotation rate; and reading out the counter electromotive force compensation value from the plurality of counter electromotive force compensation values prestored in the table based upon the determined rotation rate, the actual current and the electrical angle, if the excitation is for acceleration or constant speed.

12. A method of counter electromotive force compensation for a switch-type reluctance motor as claimed in claim 8, wherein said step of determining a counter electromotive force value comprises the steps of:

restoring a plurality of counter electromotive force compensation values in a table based upon rotation rates, actual current values, and electrical angles as variables;

determining whether an excitation of a stator of the motor is for deceleration by comparing a speed command with the rotation rate;

reading out the counter electromotive force compensation value from the plurality of counter electromotive force compensation values prestored in the table based upon rotation rates, actual current values, and electrical angles and altering the counter electromotive force compensation value to a smaller value, if the excitation is for deceleration; and reading out the counter electromotive force compensation value from the plurality of counter electromotive forces prestored in the table based upon rotation rates, actual current values, and electrical angles, if the excitation is for acceleration or constant speed.

13. A method of counter electromotive force compensation for a switch-type reluctance motor as claimed in claim 8, wherein said step of determining a counter electromotive force value comprises the steps of:

preestablishing a relational expression for counter electromotive force compensation values using rotation rates, actual current values, and electrical angles of the motor as variables;

determining whether an excitation of a stator of the motor is for deceleration by comparing a speed command with the rotation rate; and determining the counter electromotive force compensation value using the relational expression, the determining rotation rate, the actual current value, and the electrical value, if the excitation is for acceleration or constant speed.

14. A method of counter electromotive force compensation for a switch-type reluctance motor as claimed in claim 8, wherein said step of determining a counter electromotive force value comprises the steps of:

preestablishing a relational expression for counter electromotive force compensation values using rotation rates, actual current values, and electrical angles of the motor as variables;

determining whether an excitation of a stator of the motor is for deceleration by comparing a speed command with the rotation rate;

determining the counter electromotive force compensation value using the relational expression, the determined rotation rate, the actual current value, and the electrical value and adjusting the counter electromotive force compensation value by multiplying the same by a coefficient, if the excitation if the excitation is for deceleration; and determining the counter electromotive force compensation value using the relational expression, the determined rotation rate, the actual current value, and the electrical value, if the excitation is for acceleration or constant speed.

15. A switch-type reluctance motor driven based upon a voltage command, comprising:

at least one of actual current detection means for detecting an actual current of said motor and electrical angle detection means for detecting the rotor electrical angle of the motor;

rotation rate detection means for detecting a rotor rotation rate of the motor; and counter electromotive force compensation means for calculating a counter electromotive force compensation value based upon said rotation rate and the at least one of said actual current and said electrical angle;

wherein the voltage command is used in conjunction with said counter electromotive force compensation value to compensate for a counter electromotive force of the motor.

16. A switch-type reluctance motor driven based upon a voltage command, comprising:

at least one of actual current detection means for detecting an actual current of said motor and electrical angle detection means for detecting a rotor electrical angle of the motor;

rotation rate detection means for detecting a rotor rotation rate of the motor; and counter electromotive force compensation means for calculating a counter electromotive force compensation value based upon the rotation rate and the at least one of the actual current and the electrical angle; and means for determining whether an excitation of a stator of the motor is for deceleration by comparing a speed command with the rotation rate;

wherein said counter electromotive force compensation means generates the counter electromotive force compensation value if the excitation is for acceleration or constant speed, and the voltage command is used in conjunction with said counter electromotive force compensation value to compensate for a counter electromotive force of the motor.

17. A switch-type reluctance motor driven based upon a voltage command, comprising:

at least one of actual current detection means for detecting an actual current of said motor and electrical angle detection means for detecting a rotor electrical angle of the motor;

rotation rate detection means for detecting a rotor rotation rate of the motor; and counter electromotive force compensation means for calculating a counter electromotive force compensation value based upon the rotation rate and the at least one of the actual current and the electrical angle; and means for determining whether an excitation of a stator of the motor is for deceleration by comparing a speed command with the rotation rate;

wherein said counter electromotive force compensation means generates a reduced electromotive force compensation value if the excitation is for deceleration and generates the counter electromotive force compensation value if the excitation is for acceleration or constant speed, and the voltage command is used in conjunction with said counter electromotive force compensation value to compensate for a counter electromotive force of the motor.

18. A switch-type reluctance motor driven based upon a voltage command, comprising:

rotation rate detection means for detecting a rotor rotation rate of the motor;

actual current detection means for detecting an actual current of the motor;

electrical angle detection means for detecting a rotor electrical angle of the motor; and counter electromotive force compensation means for calculating a counter electromotive force compensation value based upon said rotation rate, said actual current and said electrical angle detected by said detection means, means for determining whether an excitation of a stator of the motor is for deceleration by comparing a speed command with the rotation rate;

wherein said counter electromotive force compensation means generates the counter electromotive force compensation value if the excitation is for acceleration or constant speed, and the voltage command is used in conjunction with said counter electromotive force compensation value to compensate for counter electromotive force of the motor.

19. A switch-type reluctance motor driven based upon a voltage command, comprising:

rotation rate detection means for detecting a rotor rotation rate of the motor;

actual current detection means for detecting an actual current of the motor;

electrical angle detection means for detecting a rotor electrical angle of the motor; and counter electromotive force compensation means for calculating a counter electromotive force compensation value based upon said rotation rate, said actual current and said electrical angle detected by said detection means, means for determining whether an excitation of a stator of the motor is for deceleration by comparing a speed command with the rotation rate;

wherein said counter electromotive force compensation means generates a reduced electromotive force compensation value if the excitation is for deceleration and generates the counter electromotive force compensation value if the excitation is for acceleration or constant speed, and the voltage command is used in conjunction with said counter electromotive force compensation value to compensate for counter electromotive force of the motor.

20. A switch-type reluctance motor driven based upon a voltage command, comprising:

rotation rate detection means for detecting a rotor rotation rate of the motor;

actual current detection means for detecting an actual current of the motor;

electrical angle detection means for detecting a rotor electrical angle of the motor; and counter electromotive force compensation means for calculating a counter electromotive force compensation value based upon said rotation rate, said actual current and said electrical angle detected by said detection means, wherein the voltage command is used in conjunction with said counter electromotive force compensation value to compensate for counter electromotive force of the motor.

* * * * *

UNITED STATES PATENT AND TRADEMARK OFFICE
CERTIFICATE OF CORRECTION

PATENT NO. : 5,663,625
DATED : September 2, 1997
INVENTOR(S) : Takashi SATO, et al.

It is certified that error appears in the above-indentified patent and that said Letters Patent is hereby corrected as shown below:

Title Page, Item [75], change "Musashino" to --Tokyo--.

Title Page, Item [73], change "Minamitsuru-gun" to --Yamanashi--.

Col. 2, line 25, change "$\partial\theta/\partial y$" to --$\partial\theta/\partial t$--.

Col. 3, line 6, change "$\partial\theta$" to --$\partial t$--;
line 16, change "14(b)" to --14(d)--.

Col. 6, line 36, change "8" to --6--.

Col. 8, line 23, change "S8" to --S6--.

Col. 9, line 46, change "S8" to --S6--;
line 47, change "$\beta S$" to --$\beta 3$--;
line 49, change "$\beta S$" to --$\beta 3$--.

Signed and Sealed this

Twentieth Day of January, 1998

BRUCE LEHMAN

Attest:

*Attesting Officer*  *Commissioner of Patents and Trademarks*